Feb. 16, 1932.   E. J. O'NEILL   1,845,436
MACHINE FOR MAKING SANITARY NAPKINS
Filed Sept. 28, 1931    8 Sheets-Sheet 6

Inventor
Edward J. O'neill

By Geo. P. Kimmel
Attorney

Patented Feb. 16, 1932

1,845,436

UNITED STATES PATENT OFFICE

EDWARD J. O'NEILL, OF SYRACUSE, NEW YORK

MACHINE FOR MAKING SANITARY NAPKINS

Application filed September 28, 1931. Serial No. 565,603.

This invention relates to a machine for making sanitary napkins and the application is a continuation in part of my copending application filed March 6, 1931, Serial Number 520,738.

Among the objects of the invention are to conserve time, space and labor in the manufacture of sanitary napkins; to insure uniformity of the finished napkins; to produce by automatic means sanitary napkins which are properly folded to permit their insertion in boxes or the like without further shaping the napkins; and to attain the foregoing ends in a machine of strong, compact, simple and inexpensive construction.

Other objects and advantages of the invention will be apparent from the following description considered in connection with the accompanying drawings in which:

Figure 17 is a perspective view of one of the napkins prior to the end folding operation.

Figure 18 is a perspective view of a sanitary napkin as discharged from the machine.

Referring to the drawings in detail, the numeral 1 indicates a skeleton frame upon which the working parts of the machine are mounted. Extending transversely of the frame 1 is a roll of gauze 2, the spindle of which is suitably journaled in the frame and has fixedly mounted thereon a flanged drum 3. Carried by the drum 3 is a tension device including a pair of elongated bars 4 extending across the drum on opposite sides of the latter. The ends of the bars 4 are connected by means of bolts 5 and 6, the latter being provided with a wing nut 7 in order that the friction of the bars 4 on the drum 3 may be adjusted as desired. Carried by the frame 1, adjacent the flanged drum 3, is a stationary drum 8 for abutment by one of the bars 4 to prevent rotation of the tension device. When the roll 2 is rotated to unwind the same the tension device serves as a brake and prevents slack in the unwound portion of the roll.

The material of the roll 2 is extended upwardly over a roller 9 extending transversely of the frame, and from the roller 9, the material extends forwardly along the upper face of a flat plate or board 10 extending longitudinally of the frame. Extending forwardly from the roller 9 are a pair of forwardly and upwardly inclined members 11 and 12 for lifting side marginal portions of the material 13 as the latter passes over said members. The rearward ends of the members 11 and 12 are flush with the plate 10 while the forward ends of the members 11 and 12 are materially spaced above the plate 10 at their upper surfaces. The upward inclination of the member 12 is materially greater than that of member 11 in order that one side marginal portion of the material 13 will be raised materially higher than the opposite side portion thereof. From the members 11 and 12, the side marginal portions of the material 13 are passed over a pair of hinged plates 14 and 15 which are seated on elongated blocks 16 and 17 flush with the upper faces of the members 11 and 12 respectively at the forward ends of the latter. The plates 14 and 15 converge in a forward direction with their inner edge faces intersecting and with the plate 14 projecting a material distance beyond the forward end of the plate 15. Disposed over each of the plates 14 and 15 are a row of rollers 18 which extend at a forward and inward inclination. Each roller 18 is mounted on a shaft 19 which is pivotally connected with a bifurcated bracket 20 extending upwardly from the frame 1. The shaft 19 and bracket 20 are provided with spaced openings 21 in order that the shaft may be adjusted both vertically and longitudinally with respect to the bracket.

At the rearward end of the machine is an endless belt 22 arranged substantially in the shape of a V and extending around a plurality of rollers 23, 24, 25 and 26. Seated on the belt 22 is a roll of absorbent material 27 from which a strip of absorbent material 28 is passed between a pair of oppositely moving endless belts 29 and 30. The belt 29 is mounted on a pair of rollers 31 and 32 and the belt 30 is mounted on a pair of rollers 33 and 34. The shaft of the roller 34 is carried by a pair of arms 35 having their forward ends pivotally connected with a bracket 36 carried by the frame 1. The shaft of the roller 34 seats in a bifurcated bracket 37 also carried by the frame 1. The roller 32 is driven by means of an intermittent gearing indicated generally at 38 which is operatively connected with a shaft 39 extending transversely of the frame. The gearing 38 includes an idler gear 39 mounted in a bracket 40 adjustable lengthwise of the frame in order that the gear 39 may have a similar gear substituted therefor with more or fewer teeth as desired. The shaft of the roller 34 is rotated by means of a gear 41 meshing with a similar gear 42 carried by the shaft of the roller 32. The roller 25 is operated by means of a chain 43 driven from a sprocket on the shaft of the roller 32. The foregoing assembly of belts, rollers and gears is located at one side of the frame, and a duplicate assembly is located at the opposite side of the frame. The duplicate assembly includes an intermittent gearing 44 similar to the gearing 38 and also driven from the shaft 39. The gearings 38 and 44 are so arranged with respect to each other and to the shaft 39 that the material 28 at the opposite sides of the machine will be fed alternately. The rolls 27 are maintained in position on their respective belts by means of elongated guides 45 disposed on opposite sides thereof.

Disposed within the path of each strip of material 28 is a cutter mechanism preferably of the type described and claimed in my copending application filed September 28, 1931, Serial No. 565,609. The cutter mechanisms are indicated generally by the numerals 46 and 47 and are arranged in alignment transversely of the machine. Each cutter mechanism includes a stationary plate 48 formed with a substantially I-shaped slot 49. Carried by the plates 48 are a pair of spaced die plates 50 which are of less length than the slot 49. The opposing edges of the plates 50 are formed with rounded corners 51 to conform with the contour of the slot 49, and the plates are arranged with their opposing edges flush with the edge faces of the slot. Slidably extending through the plate 48, at opposite ends of the slot 49 are a pair of rods 52 having a plate 53 connected to the upper ends thereof. Depending from the plate 53 is a cutter blade 54 which is shaped to snugly pass through the slot 49 between and at the sides of the plate 50. The blade 54 has a cutting edge 55 which inclines upwardly from the ends thereof toward the center thereof and corresponds in length to the die plates 50. The rods 52 of each of the cutter mechanisms 46 and 47 are connected at their lower ends by means of rods 56. The rods 56 are pivotally connected with connecting rods 57 which are driven from a crank shaft 58 extending transversely of the frame. The connecting rods of the cutter mechanisms are connected with the crank shaft 58 in a manner to operate the cutter mechanisms alternately.

The material 28 is discharged from between the belts 29 and 30 onto the die plates 50. While the material is seated on the die plates 50, the blade 54 is lowered through the slot 49 whereby an end portion of the strip of material is cut off, with such portion, as well as the forward end of the remaining material, having rounded corners. The blade 54 is then raised while the material is again advanced over the die plates 50, after which the blade 54 is again lowered through the slot 49 to cut off another end portion of the material. Thus it will be seen that successive downward movements of the blade 54 forms the front and rear edge respectively of a pad having rounded corners as indicated at 59. Prior to the contact of the blade 54 with the material 28, the latter is firmly held in position by means of a pair of stripper plates 60 located on opposite sides of the blade 54. Each of the plates 60 is secured to the lower end of a pair of rods 61 slidably extending through the plate 53 and provided at their upper ends with stop nuts 62. When the plate 53 is in its raised position the stripper plates 60 depend below the cutting edge of the blade 54 in order that the plates 60 will be lowered into contact with the material 28 before the latter is engaged by the blade 54. When the plate 53 is moved to its raised position, the plates 60 remain stationary until the plate 53 engages the stop nuts 62 in order to prevent the pads 59 or strips of material 28 from sticking to the blade 54.

Disposed forwardly of the cutter mechanisms 46 and 47 is a substantially Y-shaped tray 63 for receiving the pads from the cutter mechanisms. The tray 63 is provided with a pair of upstanding spaced ribs 64 and 65 for guiding the pads from the cutter mechanism 47, and with a similar pair of ribs 66 and 67 for guiding the pads received from the cutter mechanism 46. Between each pair of pad guiding ribs, the tray is formed with a slot 68 beneath each of which is located an endless chain 69. Each of the chains 69 passes around a drive sprocket 70 and a plurality of idler sprockets 71, 72, 73, 74 and 75. The drive sprockets 70 are mounted on the upper ends of shafts 76, the lower ends of which are provided with beveled gears 77 meshing with beveled gears 78 mounted on a shaft 79 extending transversely of the frame. Each of the chains 69 is provided with a plurality of wipers 80 which pass between the pad guiding ribs of the tray and which are connected with the chain by means of stems 81' extending through the slots 68. The pads 59 which are deposited on the tray 63 are pushed between the pad guiding ribs by means of the wipers 80 and deposited between a pair of adjustable guides 81 onto the strip of gauze 13 adjacent the forward ends of the inclined lifting elements 11 and 12.

Figure 9:
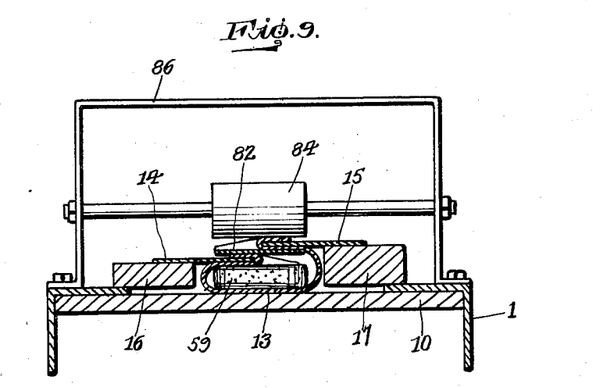
Figure 9 is an enlarged section taken substantially on the line indicated at 9—9 of Figure 2.
Figure 10:
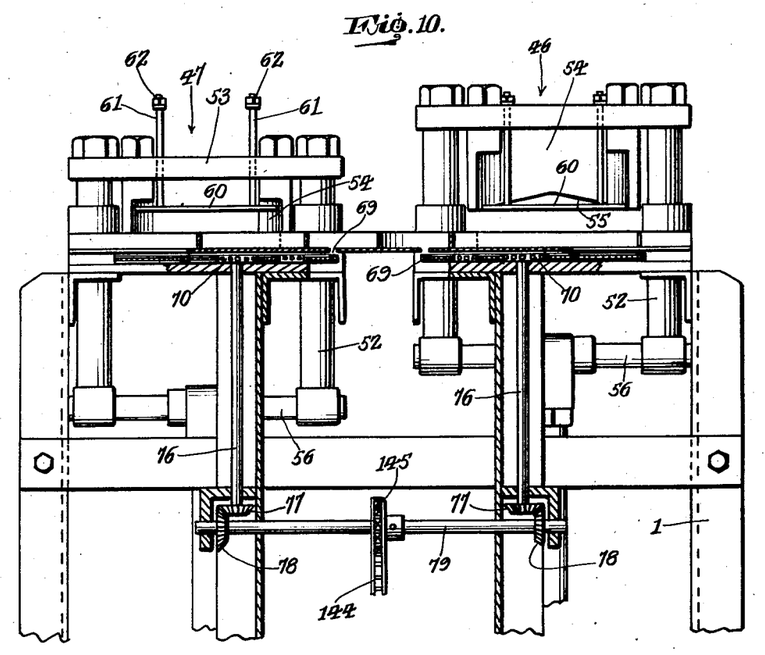
Figure 10 is an enlarged fragmentary section taken substantially on the line 10—10 of Figure 2.
Figure 11:
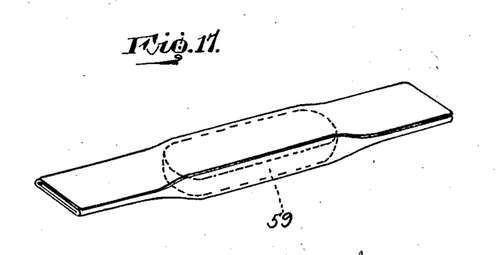
Figure 11 is an enlarged section taken substantially on the line 11—11 of Figure 2.
Figures 12, 13:
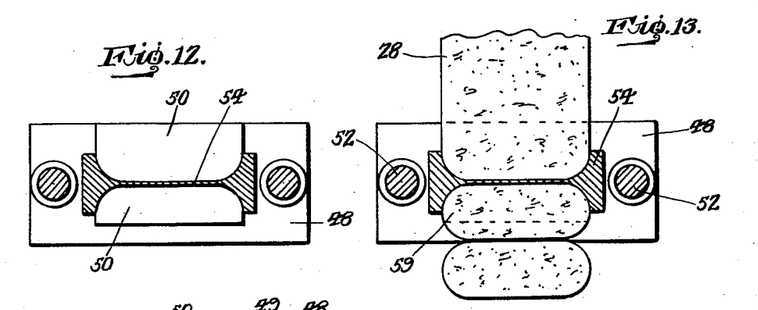
Figure 12 is a section taken substantially on the line 12—12 of Figure 11.
Figure 13 is a view similar to Figure 12 but shown in connection with the strip of absorbent material used in the manufacture of sanitary napkins.
Figure 14:
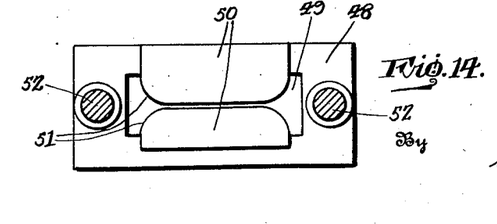
Figure 14 is a section taken substantially on the line 14—14 of Figure 11.
Figure 16:
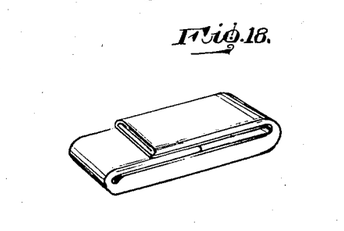

As the strip of material 13 is advanced in a forward direction, the side marginal portions thereof are folded over the pads 59 by means of the converging plates 14 and 15 as more clearly shown in Figure 9. As the side portions of the strip 13 are folded over, they are maintained out of contact by means of a flexible separator element 82 having its rearward end connected to a rod 83 and having its forward end free. As the strip 13 advances, the same is maintained in snug engagement with the inner edge faces of the plates 14 and 15 by means of the rollers 18 located above the plates and bearing against the strip 13. The plates 14 and 15 are hinged at their outer side edges in order that inner portions thereof may swing upwardly in the event of excessive lumpiness in the pad material, thereby preventing any likelihood of the machine becoming clogged by such lumpiness.

After the side marginal portions of the strip have been folded over the pads 59, the material passes beneath a squeeze roller 84 having its spindle extending through slots 85 in a substantially inverted U-shaped bracket 86. From beneath the roller 84, the material is passed between a pair of oppositely moving belts 87 and 88. The belt 87 is mounted on a drive roller 89 and a plurality of idler rollers 90, 91, 92 and 93. The belt 88 is mounted on a drive roller 94 and a pair of idler rollers 95 and 96. The idler roller 92 is located forwardly of and below the roller 91 in order that a forward stretch of the belt 87 will be disposed at a forward and downward inclination. The idler roller 96 is carried by a pair of arms 97 pivotally connected with a pair of brackets 98 in order that a forward stretch of the belt 88 may be disposed at a forward and downward inclination to rest by gravity on the downwardly inclined stretch of the belt 87.

Tht folded material is discharged from the belts 87 and 88 between a pair of endless conveyors 99 and 100. Each of the conveyors 99 and 100 includes a pair of spaced chains connected together at spaced intervals by bars 101. The chains of the conveyor 100 are mounted on sprockets 102 and 103, while the conveyor 99 is mounted on sprockets 104, 105, 106, 107 and 108. The conveyors 99 and 100 are timed with respect to each other in such a manner that their bars 101 will be brought into engagement with the folded material simultaneously whereby the material is carried forward by the oppositely moving conveyors. As the folded material is carried forward by the conveyors 99 and 100, the material is cut into predetermined lengths by means of a revoluble knife 109 and an adjustable stationary knife 110 disposed on opposite sides of the material. The length of material thus cut is carried forward until the bars 101 engaging such length are separated by the passage of the conveyor 100 around the sprocket 103. As the bars 101 are separated, a finger 111 forces that portion of the material immediately in advance of the pad folded therein between a pair of oppositely moving belts 112 and 113 which causes the forward end portion of the cut length to be folded back over the central portion thereof. The finger 111 is normally maintained out of contact with the material by means of a spring 114 secured to a bracket 115, and is moved into contact with the material at the proper time by means of a cam 116 which engages a disc 117 carried by the finger 111. The belt 112 extends around a pair of rollers 118 and 119, while the belt 113 extends around a pair of rollers 120 and 121.

Figure 1A:
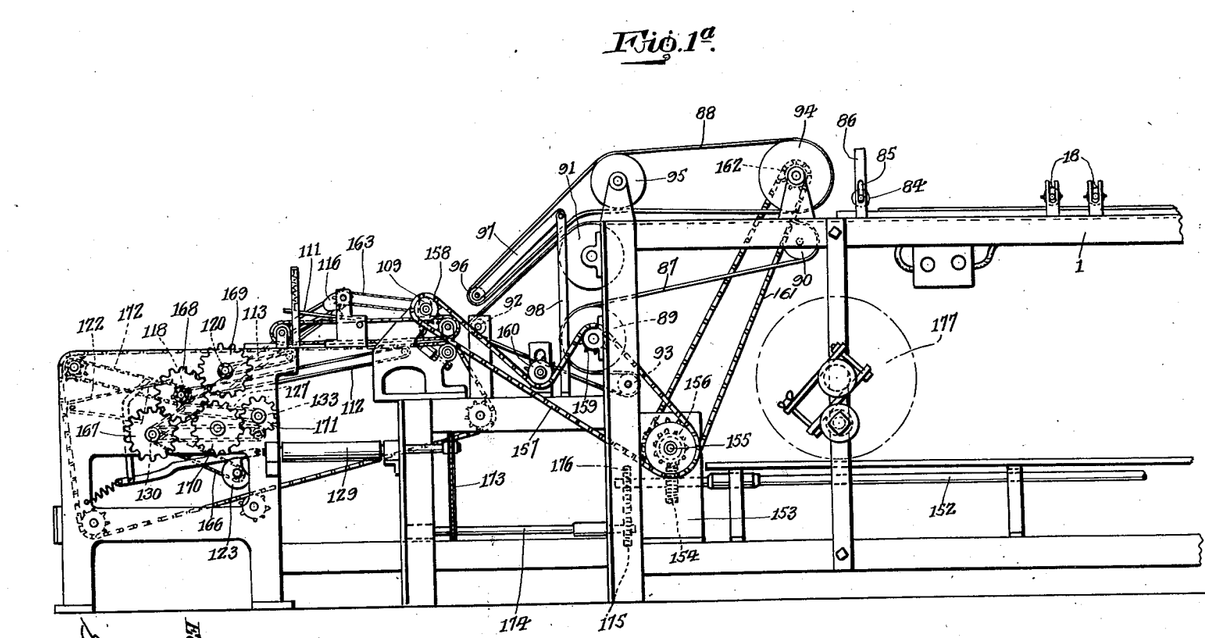
Figures 1a and 1b collectively show the machine in side elevation.
Figure 1B:
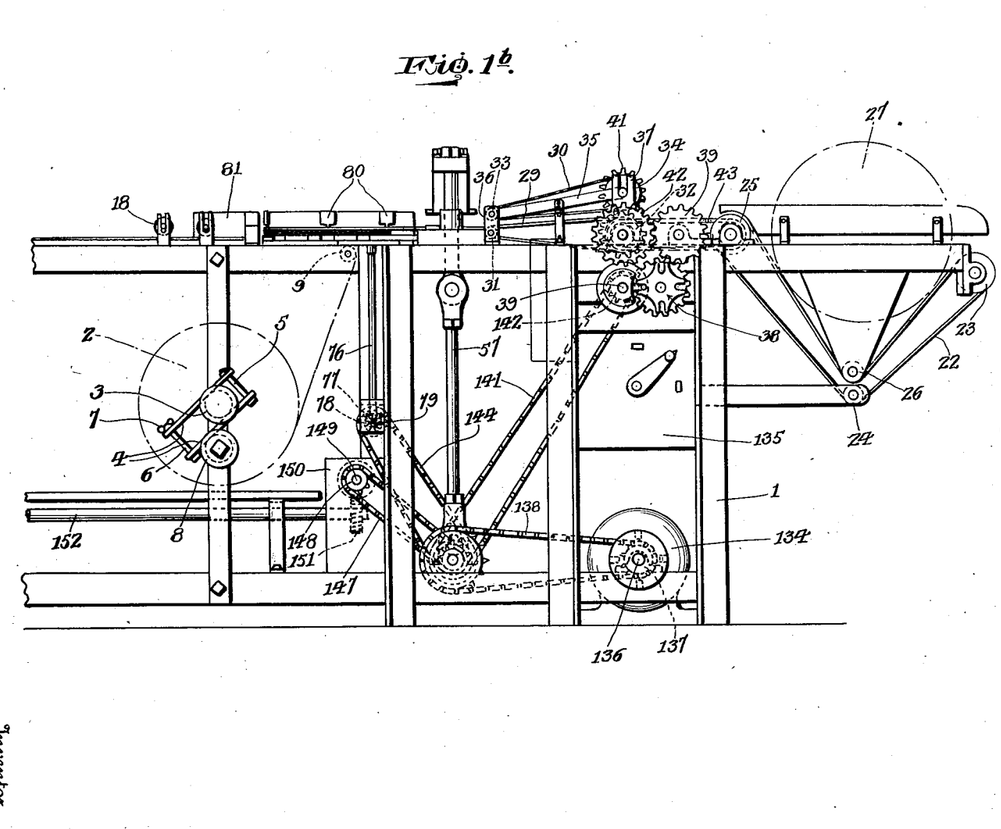
Figures 2, 15, 16:
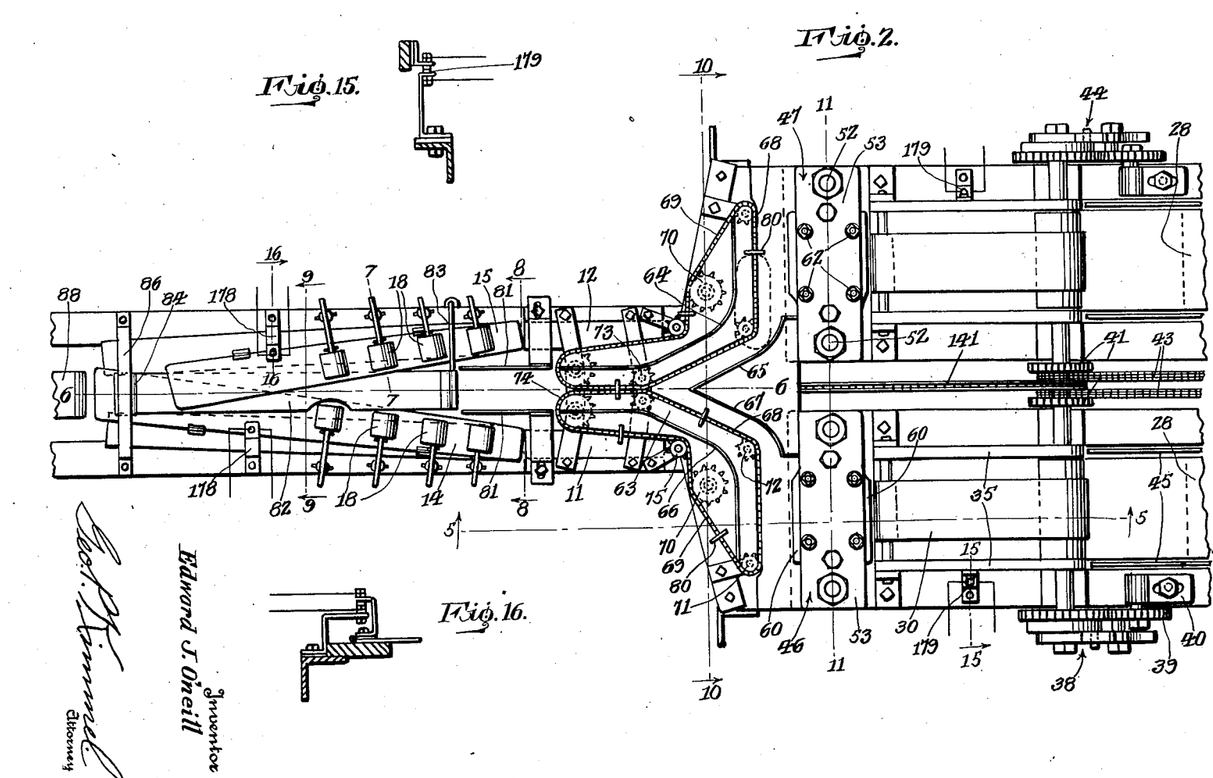
Figure 2 is a fragmentary top plan showing a rear end portion of the machine.
Figure 15 is an enlarged section taken on the line 15—15 of Figure 2.
Figure 16 is an enlarged section taken on the line 16—16 of Figure 2.
Figure 3:
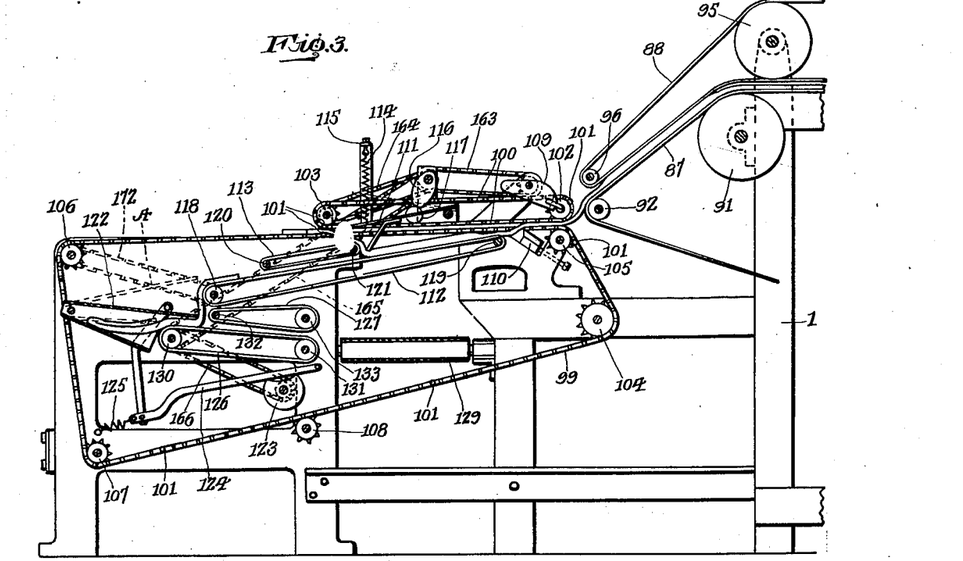
Figure 3 is an enlarged sectional elevation of a forward end portion of the machine.
Figure 4:
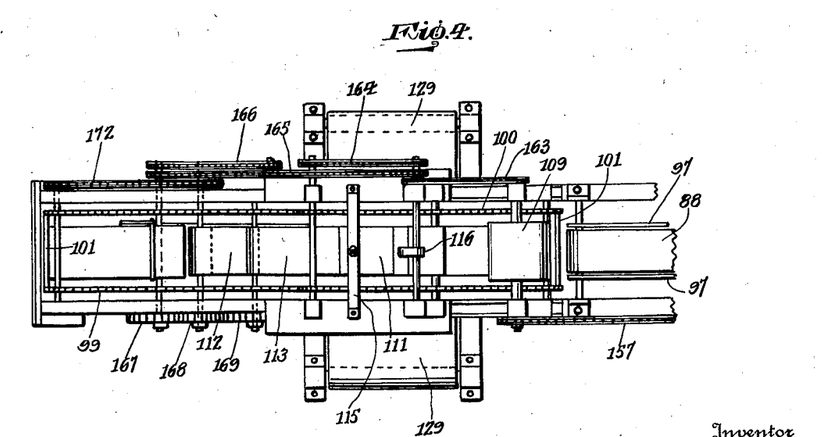
Figure 4 is a fragmentary top plan of the forward end of the machine.
Figure 5:
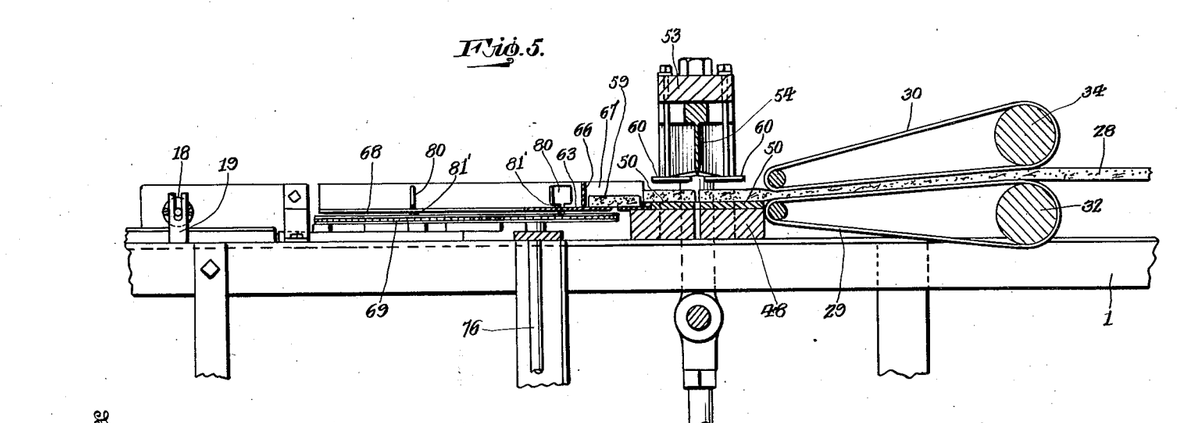
Figure 5 is an enlarged fragmentary section taken substantially on the line indicated at 5—5 of Figure 2.
Figures 6, 7:
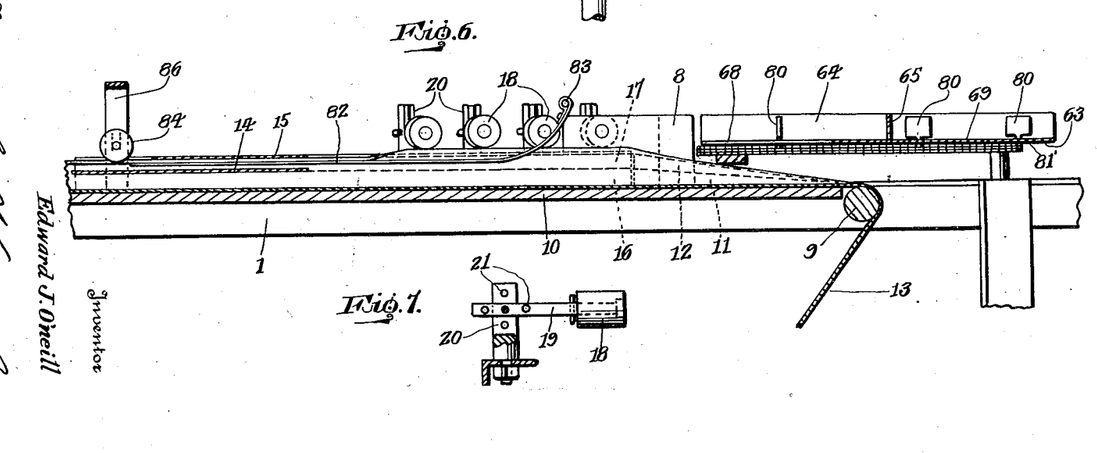
Figure 6 is an enlarged fragmentary section taken on the line 6—6 of Figure 2.
Figure 7 is an enlarged sectional elevation showing one of the rollers of the folding mechanism and indicated by the line 7—7 of Figure 2.
Figure 8:
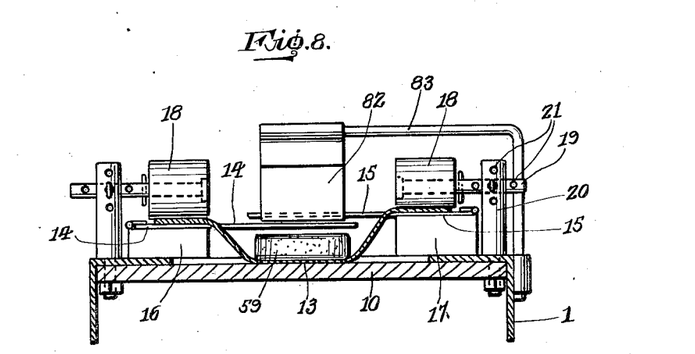
Figure 8 is an enlarged section taken substantially on the line indicated at 8—8 of Figure 2.

From the belts 112 and 113 the length of material is discharged into a pivoted tray 122 which has been moved into its raised position, shown in dotted lines and designated A in Figure 3, by means of a cam 123 which raises an angular lever 124 pivotally connected with the tray 122 and frame 1. After the operation of the cam 123, the tray 122 is immediately drawn into the position shown in full lines in Figure 3 by the action of a spring 125 connected with the lever 124 and frame 1. The upper wall of the tray 122 extends materially beyond the lower wall thereof whereby the material at a point adjacent the rearward end of the pad therein is pressed against an endless belt 126, and as the length of material passes between the belt 126 and an oppositely moving belt 127 the rearward end portion of the material is folded over the central portion thereof and the completely folded napkin is discharged onto a conveyor 129 extending transversely of the machine. The belt 126 is mounted on a pair of rollers 130 and 131, and the belt 127 is mounted on a pair of rollers 132 and 133.

The moving parts of the machine are operated from a motor 134 connected with a control box 135. The shaft 136 of the motor is provided with a sprocket 137 which is connected by means of a chain 138 with a sprocket 139 on the crank shaft 58. The shaft 58 is provided with a sprocket 140 which is connected by means of a chain 141 with a sprocket 142 on the shaft 39 to drive the latter. The shaft 58 is also provided with a sprocket 143 which is connected by means of a chain 144 with a sprocket 145 on the shaft 79 for driving the latter. The crank shaft 58 is also provided with a sprocket 146 which is connected by means of a chain 147 with a sprocket 148 on a worm shaft 149. The worm shaft 149 extends into a gear box 150 and meshes with a pinion 151 on a shaft 152 extending forwardly of the machine through a gear box 153. Within the gear box 153, the shaft 152 is provided with a pinion 154 which operates a worm shaft 155 having a sprocket 156 for driving a chain 157. The chain 157 extends around a sprocket 158 on the shaft of the revoluble knife 109 for operating the latter, and also extends around a sprocket 159 on the shaft of the roller 89 for driving the belt 87. The chain 157 further passes over an adjustable idler roller 160 by means of which the tension of the chain may be adjusted. The worm shaft 155 is further provided with a sprocket which drives a chain 161 passing around a sprocket 162 on the shaft of the roller 94 for driving the belt 88. The cam 116 is driven from the shaft of the revoluble knife 109 by means of a chain 163. The conveyor 100 is driven from the shaft of the cam 116 by means of a chain 164 extending around one of the sprockets 103. The belt 126 also is driven from the shaft of the cam 116 by means of a chain 165 connected with a sprocket on the shaft of the roller 130. The cam 123 is driven from the roller 130 by means of a chain 166. The shaft of the roller 130 is provided with a gear 167 which meshes with a gear 168 on the shaft of the roller 118 for operating the belt 112. The gear 168 meshes with a gear 169 on the shaft of the roller 120 for operating the belt 113. The gear 168 meshes with an idler gear 170 which meshes with a gear 171 on the shaft of the roller 133 for operating the belt 127. The conveyor 99 is driven from the shaft of the roller 118 by means of a chain 172 extending around one of the sprockets 106. The discharge conveyor 129 is driven by means of a chain 173 which is operated from a shaft 174 having a gear 175 meshing with the gear 176 on the shaft 152.

In the operation of the machine, the gauze 13 is moved continuously over the folding plates 14 and 15 by means of the belts 87 and 88. In order to reduce to a minimum the length of time which is necessary to stop the machine upon the exhaustion of the roll of gauze, a similar roll 177 is mounted on the machine forwardly of the roll 2. Upon using all of the gauze from the roll 2, it is merely necessary to thread the gauze from the roll 177 over the roller 9 and beneath the rollers 18 and 84 to a position between the belts 87 and 88. The cutter mechanisms 46 and 47 operate alternately to discharge the pads 59 onto the tray 63. Upon the cutting of a pad by one of the mechanisms 46 or 47, the pad remains seated on the foremost of the die plates 50 until the next movement of the material 28 in a forward direction. This movement pushes the previously cut pad onto the tray 63 from which it is deposited onto the gauze 13 by the operation of one of the wiper elements 80 on one of the chains 69. The pads 59 are deposited on the gauze 13 at equi-spaced intervals, preferably twelve inches apart. The rollers 18 above the folding plates 14 and 15 normally prevent wrinkling or lumping of the gauze during the folding thereof, however in the event of inadvertent lumping or bunching of the material beneath the plates, the latter swing about their hinged connection, thereby breaking a switch 178 carried thereby and connected with the source of power for the motor 134 through the control box 135. One of the switches 178 is provided for each of the plates 14 and 15, and upon the operation of one of the switches the entire machine is instantly stopped. Similar switches 179 are carried by one of the pivoted arms 35 of each of the absorbent material feeding mechanisms in order that the machine will be instantly stopped in the event of any bunching or lumping of the absorbent material beneath the rollers 34. The revoluble knife 109 preferably is timed with respect to the travel of the gauze so that the gauze will be cut with a slightly greater length of material following the pad than that which precedes the pad. The movement of the bars 101 of the conveyors 99 and 100 towards each other is timed with respect to the operation of the knife 109 in such a manner that the material will be gripped rearwardly of the knife just preceding the operation of the latter in order that the folded material will be fed continuously between the conveyors. The cams 116 and 123 are timed with respect to the knife 109 in a manner to operate the finger 111 and tray 122 once for each length of material cut by the knife 109.

While the embodiment of the invention herein illustrated and described is to be considered as a preferred example of the same, it is to be understood that changes in the details of construction may be made, so long as such changes fall within the scope of the appended claims.

What I claim is:—

1. In a machine for making sanitary napkins, means for continuously moving a strip of covering material along a fixed route, means for intermittently moving a strip of absorbent material along a fixed route, means for forming the absorbent material strip into elongated pads, means for depositing the pads on the covering material strip at equi-spaced points longitudinally of the latter, means for folding side marginal portions of the covering material strip over the pads deposited thereon, a conveyor for engagement with the folded strip forwardly of the pads carried thereby, a knife for severing the folded strip rearwardly of the pads carried thereby to form a plurality of lengths, each having a pad within the folds thereof in spaced relation to the ends of the lengths, upper and lower endless belts forwardly of said knife, said belts being oppositely movable, said upper belt having its rearward end disposed forwardly of the rearward end of the lower belt, means for depressing said lengths adjacent the forward edges of the pads carried thereby and adjacent the rearward end of the upper belt to provide for the entrance of the lengths between said belts at points adjacent the pads whereby the forward portions of the lengths are folded over the pads, and means for folding the rearward portions of said lengths over said pads to complete the napkins.

2. In a machine for making sanitary napkins, means for continuously moving a strip of covering material along a fixed route, means for intermittently moving a strip of absorbent material along a fixed route, means for forming the absorbent material strip into elongated pads, means for depositing the pads on the covering material strip at equi-spaced points longitudinally of the latter, means for folding said marginal portions of the covering material strip over the pads deposited thereon, means for cutting the folded covering material strip into lengths with a pad contained within the folds of each length in spaced relation to the ends of the latter, means for folding forward end portions of said lengths over the pads, a pivoted tray for receiving forward end portions of the lengths so folded, a pair of oppositely moving endless belts adjacent the tray and beneath the line of travel of the folded lengths entering the tray, one of said belts being above the other and having its forward end disposed rearwardly of the forward end of the other, and means for swinging the tray downwardly about its pivot, said tray when so swung having a portion thereof abutting the folded lengths adjacent the rearward edges of the pads carried thereby and adjacent the forward end of the upper of said belts to provide for the entrance of the folded lengths between said belts at points adjacent the rearward edges of the pads whereby the rearward end portions of the lengths are folded over the pads to complete the napkins.

3. In a machine for making sanitary napkins, a conveyor for engagement with a length of material adjacent the forward end thereof to move the material lengthwise, upper and lower, oppositely movable endless belts, said upper belt having its rearward end disposed forwardly of the rearward end of the lower belt, means for depressing said material in spaced relation to the forward end thereof and adjacent the rearward end of the upper belt to provide for the entrance of the material between said belts at a point spaced from the forward end thereof to fold a forward portion of the material, a pivoted tray for receiving a forward end portion of the material so folded, a pair of oppositely moving endless belts adjacent the tray and beneath the line of travel of the folded material entering the tray, one of said last named belts being above the other and having its forward end disposed rearwardly of the forward end of the other, and means for swinging the tray downwardly about its pivot, said tray when so swung having a portion thereof abutting the folded material adjacent the forward end of the upper of said last named belts to provide for the entrance of the folded material between said belts at a point spaced from the rearward end of the material for folding the rearward end portion of the latter.

4. In a machine for making sanitary napkins, an elongated frame, means for moving a flat strip of material lengthwise of the frame, a pair of elements gradually increasing in height in a forward direction for lifting side marginal portions of the strip during the travel thereof, one of said elements having a steeper grade than the other, a pair of plates for receiving thereon the lifted marginal portions of the strip, said plates converging in a forward direction to fold said marginal portions over the pads during the travel of the strip, one of said plates being higher than the other, and a flexible separator element extending lengthwise of the strip centrally thereof and located between the horizontal planes of said plates to maintain said marginal portions out of contact with each other during the folding thereof.

5. In a machine for making sanitary napkins, an elongated frame, means for moving a flat strip of material lengthwise of the frame, a pair of elements gradually increasing in height in a forward direction for lifting side marginal portions of the strip during the travel thereof, one of said elements having a steeper grade than the other, a pair of plates for receiving thereon the lifted marginal portions of the strip, said plates converging in a forward direction to fold the said marginal portions over the pads during the travel of the strip, and rollers disposed above said plates and arranged in forwardly and inwardly inclined rows for engagement with said marginal portions to maintain the latter taut with respect to the inner edges of said elements.

6. In a machine for making sanitary napkins, an elongated frame, means for moving a strip of covering material lengthwise of the frame, means for depositing absorbent pads in spaced relation on said strip a pair of elements for lifting side marginal portions of the strip during the travel thereof a pair of forwardly converging plates hinged at their outer edges for receiving the lifted marginal portions of the strip to fold said marginal portions over the pads during the travel of the strip and means for cutting the folded strip between said pads.

7. In a machine for making sanitary napkins, means for moving a strip of covering material endwise along a fixed route, means for moving a strip of absorbent material parallel to the direction of movement of the covering material, means for cutting the absorbent material into elongated pads, a tray for receiving said pads with the latter disposed transversely of the direction of travel of the covering material, guide elements describing curves of substantially 90° on said tray, means for pushing said pads along said guide elements to turn the pads and deposit them lengthwise on the covering material, means for folding the covering material over the pads, and means for cutting the folded covering material between the pads.

8. In a machine for making sanitary napkins, means for moving a strip of covering material endwise along a fixed route, a tray for receiving elongated pads with the latter disposed transversely of the direction of travel of said strip, guide elements describing curves of substantially 90° on said tray, means for pushing said pads along said guide elements to turn the pads and deposit them lengthwise on the covering material, means for folding the covering material over the side edges of the pads, means for cutting the folded covering material between the pads, and means for folding the cut folded covering material over the end edges of the pads.

9. In a machine for making sanitary napkins, means for moving a strip of covering material endwise along a fixed route, means for intermittently and alternately feeding strips of absorbent material parallel to the direction of movement of the covering material, means for alternately cutting said strips of absorbent material into elongated pads, a substantially Y-shaped tray for receiving said pads with the latter disposed transversely of the line of travel of the covering material, guide elements curved to conform with the shape of the tray for guiding said pads on the tray, alternately operating wiper elements for pushing the pads along said guide elements to turn the pads and deposit them lengthwise on the strip of covering material, means for folding the covering material over the pads, and means for cutting the folded covering material between the pads.

10. In a machine for making sanitary napkins, means for moving a strip of covering material endwise along a fixed route, means for moving a strip of absorbent material parallel to the direction of movement of the covering material, means for cutting the absorbent material into elongated pads, a tray for receiving said pads with the latter disposed transversely of the line of travel of the covering material, guide elements describing curves of substantially 90° on said tray, said tray having a slot between said guide elements, an endless chain beneath and in alignment with said slot, a wiper element carried by said chain and projecting through the slot for pushing said pads along said guide elements to turn the pads and deposit them lengthwise on the covering material, means for folding the covering material over the pads, and means for cutting the folded covering material between the pads.

11. In a machine for making sanitary napkins, means for continuously moving a strip of covering material along a fixed route, means for intermittently moving a strip of absorbent material along a fixed route, means for forming the absorbent material strip into elongated pads, means for depositing the pads onto the covering material strip at spaced points longitudinally of the latter, means for folding side marginal portions of the covering material strip over the pads deposited thereon, means for cutting the folded covering material strip into lengths with a pad contained within the folds of each length in spaced relation to the ends of the latter, a pair of spaced sets of endless belts, each set including an upper belt and a lower belt, means for inserting said lengths between the belts of one set adjacent the forward edges of the pads to fold the forward ends of said lengths over the pads, and means for inserting said lengths between the belts of the other set adjacent the rearward edges of the pads to fold the rearward ends of said lengths over the pads.

12. In a machine for making sanitary napkins, means for depositing absorbent pads in spaced relation on a moving strip of covering material, means for folding side marginal portions of the strip over the pads, a pair of oppositely rotating endless conveyors wholly disposed forwardly of said folding means for receiving the folded strip therebetween to provide for the movement of said strip of covering material, a pair of spaced sets of endless belts, each set included an upper belt and a lower belt, means for inserting said lengths between the belts of one set adjacent the forward edges of the pads to fold the forward ends of said lengths over the pads, and means for inserting said lengths between the belts of the other set adjacent the rearward edges of the pads to fold the rearward ends of said lengths over the pads.

13. In a machine for making sanitary napkins, means for depositing absorbent pads in spaced relation on a moving strip of covering material, means for folding side marginal portions of the strip over the pads, a knife for severing the folded strip rearwardly of the pads carried thereby to form a plurality of lengths, each having a pad within the folds thereof in spaced relation to the ends of the lengths, a pair of spaced sets of endless belts, each set including an upper belt and a lower belt, means for inserting said lengths between the belts of one set adjacent the forward edges of the pads to fold the forward ends of said lengths over the pads, and means for inserting said lengths between the belts of the other set adjacent the rearward edges of the pads to fold the rearward ends of said lengths over the pads.

14. In a machine for making sanitary napkins, means for moving a strip of covering material along a fixed route, means for depositing pads on said strip, means for folding side marginal portions of the strip over the pads, and a separator element disposed over the strip for maintaining the side marginal portions of the strip out of contact with each other during the folding thereof.

15. In a machine for making sanitary napkins, the napkins being of a type consisting of a pad encompassed by a covering formed from an overlapped flat strip, a combined folding and fold separator mechanism for the strip, said mechanism including a pair of lifter elements for lifting the side marginal portions of the strip with respect to the pad, a pair of folders acting upon said marginal portions to position them in overlapped spaced relation with respect to the pad and with respect to each other, and a separator located between the horizontal planes of the folders for maintaining said side marginal portions out of contact with each other during the folding thereof.

16. In a machine for making sanitary napkins, means for continuously moving a strip of covering material along a fixed route, means for intermittently moving a strip of filling material along a fixed route, a strip severing and corner rounding device successively operating on said filling material strip at spaced intervals to completely sever such strip into successive portions and simultaneously with such severing rounding the opposing corners of the severed portions to provide elongated pads having rounded corners, and means for depositing the pads so formed on the strip of covering material and including curved guides for turning the pads during the depositing thereof to position the same lengthwise of the covering material.

17. In a machine for making sanitary napkins, means for encompassing a pad within a length of covering material extending from the ends of the pad, a pair of spaced sets of endless belts, each set including an upper belt and a lower belt, means for inserting said length between the belts of one set adjacent the forward edge of the pad therein to fold the forward end of said length over the pad, and means for inserting said length between the belts of the other set adjacent the rearward edge of the pad to fold the rearward end of said length over the pad.

In testimony whereof I affix my signature.

EDWARD J. O'NEILL.